(12) United States Patent
Lin

(10) Patent No.: US 8,820,126 B2
(45) Date of Patent: Sep. 2, 2014

(54) ANTI-THEFT FASTENER WITH LOCKING FEATURE

(71) Applicant: Yu-Pin Lin, Tainan (TW)

(72) Inventor: Yu-Pin Lin, Tainan (TW)

(*) Notice: Subject to any disclaimer, the term of this patent is extended or adjusted under 35 U.S.C. 154(b) by 127 days.

(21) Appl. No.: 13/726,551

(22) Filed: Dec. 25, 2012

(65) Prior Publication Data

US 2014/0178147 A1 Jun. 26, 2014

(51) Int. Cl.
*F16B 41/00* (2006.01)
*F16B 39/12* (2006.01)

(52) U.S. Cl.
CPC .................... *F16B 39/12* (2013.01)
USPC .................. 70/232; 70/166; 70/259

(58) Field of Classification Search
USPC .................. 70/158, 163, 166–167, 229–232, 70/258–260
See application file for complete search history.

(56) References Cited

U.S. PATENT DOCUMENTS

| | | | | | |
|---|---|---|---|---|---|
| 3,540,245 | A | * | 11/1970 | Pope | 70/231 |
| 4,030,324 | A | * | 6/1977 | Rizio | 70/232 |
| 4,302,137 | A | * | 11/1981 | Hart | 70/231 |
| 5,097,686 | A | * | 3/1992 | Plumer | 70/232 |
| 6,519,985 | B2 | * | 2/2003 | Grant | 70/232 |
| 6,634,195 | B2 | * | 10/2003 | Lenz et al. | 70/232 |
| 7,392,674 | B1 | * | 7/2008 | Grote | 70/232 |
| 7,409,843 | B1 | * | 8/2008 | Rinehart, Sr. | 70/232 |
| 7,673,482 | B2 | * | 3/2010 | Bosman | 70/232 |

* cited by examiner

*Primary Examiner* — Christopher Boswell

(57) ABSTRACT

An anti-theft fastener with locking feature includes a nut, a nut casing, a lock casing and a lock. An engaging ball of the lock casing gets embedded in an engaging groove of the nut casing. The lock and its' casing are positioned inside the nut casing. An abutting portion of the lock no longer abuts against a positioning ball of the nut. The positioning ball is no longer embedded inside a positioning engaging passage of the nut casing, thereby preventing the nut casing from driving the nut except idling. Under locked condition, the fastener is unable to be mounted. To dismount the fastener requires turning the lock with a key until the engaging ball falls into a curved groove of the lock and exits the engaging groove. The positioning ball is pushed outward and embedded inside the positioning engaging passage, thereby unfastening the screw element.

2 Claims, 5 Drawing Sheets

ANTI-THEFT FASTENER WITH LOCKING FEATURE

BACKGROUND OF THE INVENTION

1. Technical Field

The present invention relates to anti-theft fastener with locking feature, particularly to a fastener with its' polygonal nut providing with locking feature therein a fastener so as to prevent the nut from being loosened and thereby to reach the purpose of anti-theft.

2. Description of Related Art

Generally, the external wall surface of a nut which meshes with a bolt or a screw is usually hexagonal. The internal wall surface of the nut has an inner thread. A sleeve or a wrench is used to grip the hexagonal external wall surface of the nut to thereby fasten the nut to the bolt or the screw or unfasten the nut from the bolt or the screw. However, the nut typically lacks a locking feature, and thus in the situation where precious articles are fixed by a fastener in place, such as fastening the wheels to wheel axle of a bicycle, fastening hub to wheel rim of a vehicle's tire, or, fastening storage battery to a vehicle, the articles are targets to theft, as a conventional sleeve or wrench can be fitted around the nut to loosen or tighten it. In general, fastener can not prevent from be stolen. In view of the aforesaid drawback of the prior art, the inventor of the present invention conducted extensive researches and experiments according to the inventor's years of experience in the related industry, and finally developed an anti-theft fastener with locking feature as disclosed in the present invention.

SUMMARY OF THE INVENTION

The objective of the present invention is to provide an anti-theft fastener with locking feature capable of being firmly fastened to a bolt or a screw and manifesting anti-theft. The anti-theft fastener with locking feature of the present invention is comprised of: a nut having therein a concave chamber and having an end provided with a flange, the concave chamber having therein an inner screw hole extending to and being in communication with an outer end of the flange, wherein at least a position-limiting hole is disposed on the external wall surface of the nut and communicates with the concave chamber of the nut, the at least a position-limiting hole having therein a positioning ball, wherein at least a receiving groove is disposed on an outer end side of the concave chamber of the nut, wherein a spring and an ejecting pin are disposed in the receiving groove of the nut; a ring disposed on the flange of the nut; a nut casing disposed outside the nut, the nut casing having therein a receiving chamber and a receiving channel, wherein an engaging groove is disposed between the receiving channel and the receiving chamber of the nut casing, wherein at least a positioning engaging passage is disposed in the receiving chamber of the nut casing and corresponds in position to the positioning ball of the nut, wherein a through hole is disposed at an outer end of the receiving channel of the nut casing; a lock casing disposed in the receiving channel of the nut casing, wherein a press portion is disposed at an end of the lock casing and inserted into the through hole of the nut casing, the lock casing having therein a receiving chamber, the press portion having a through hole passing through the receiving chamber of the lock casing, wherein a guide groove is disposed on an inner wall surface of the receiving chamber of the lock casing, wherein at least a pin hole and at least a position-limiting hole are disposed on a wall surface of the lock casing, the at least a pin hole having therein a fixing pin, the at least a position-limiting hole having therein an engaging ball; and a lock disposed in the receiving chamber of the lock casing and having an annular groove, wherein a guide strip and at least a curved groove are disposed on a wall surface of the lock, the guide strip being disposed in the guide groove of the lock casing, wherein an abutting portion is disposed at an end of the lock.

As regards the anti-theft fastener with locking feature of the present invention, at least a positioning engaging passage is disposed on an end side of the lock casing to accommodate the ejecting pin of the nut.

The user presses a press portion of the lock casing of the nut casing inward to drive the lock moving inward, and thus the engaging ball of the lock casing moves to reach the engaging groove of the nut casing. The lock and the lock casing are positioned inside the nut casing. The abutting portion of the lock no longer abuts against the positioning ball of the nut. The positioning ball of the nut is no longer embedded in the positioning engaging passage of the nut casing. As a result, the nut casing fails to drive the nut to rotate but starts idling, such that, in a locked condition, the anti-theft fastener with locking feature is unable to be mounted. To dismount the anti-theft fastener with locking feature, the user only needs to turn the lock by using a key, such that the engaging ball of the lock casing falls into the curved groove of the lock, whereas the engaging ball exits the engaging groove of the nut casing, and thus the ejecting pin is pushed outward because of the resilient restoration of the spring. As a result, the lock casing is pushed outward by the ejecting pin, whereas the lock casing drives the lock to move outward together. At this point in time, the abutting portion of the lock pushes the positioning ball of the nut outward such that the positioning ball is embedded in the positioning engaging passage of the nut casing, thereby allowing the nut casing to drive the nut to rotate. Accordingly, the anti-theft fastener with locking feature can be unfastened from the bolt or the screw.

BRIEF DESCRIPTION OF THE SEVERAL VIEWS OF THE DRAWINGS

This invention will be better understood by referring to the accompanying drawings, wherein.

DETAILED DESCRIPTION OF THE EMBODIMENT OF THE INVENTION

Figure 1:
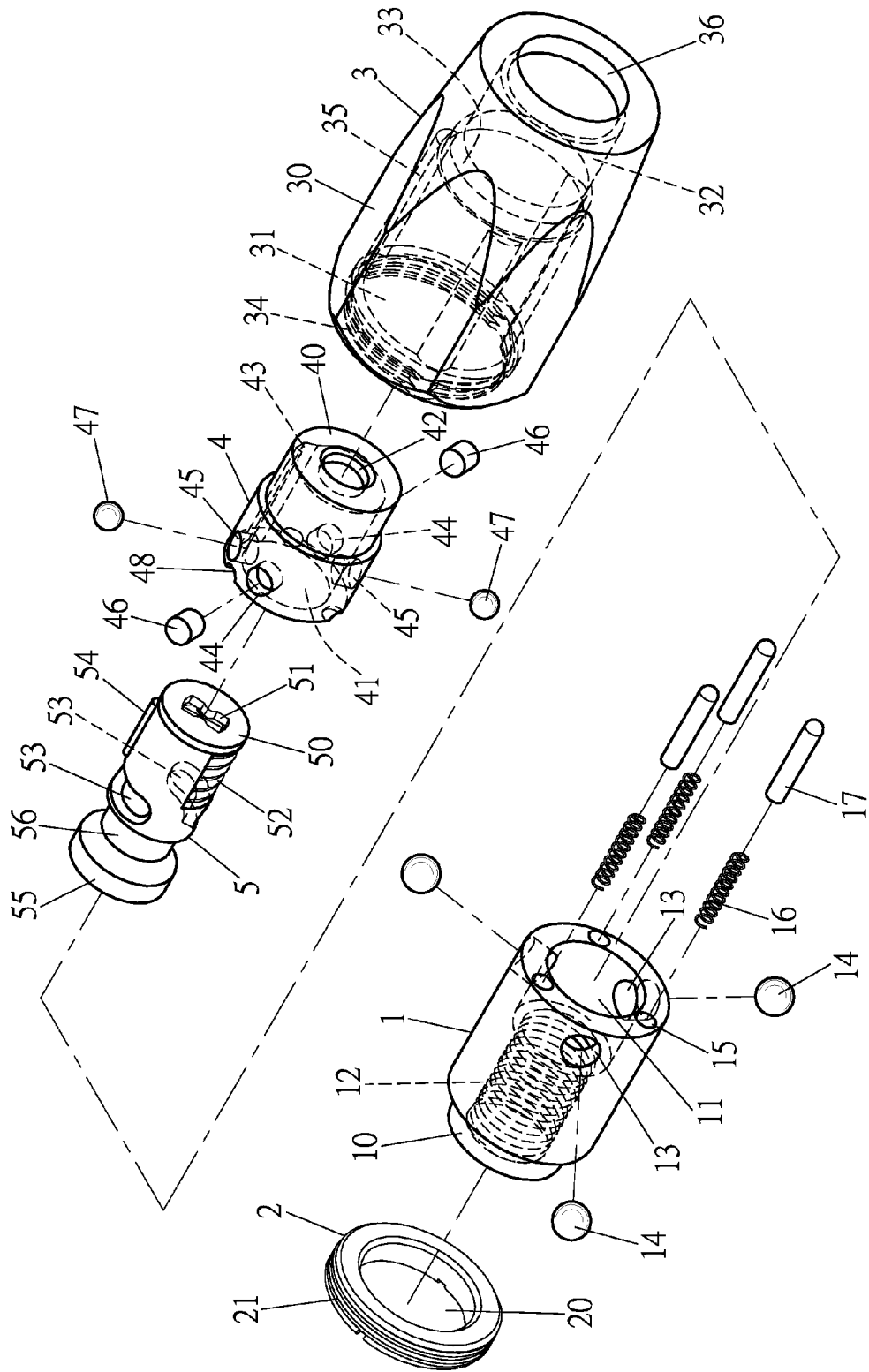
FIG. 1 is an exploded view of an anti-theft fastener with locking feature according to an embodiment of the present invention.
Figure 2:
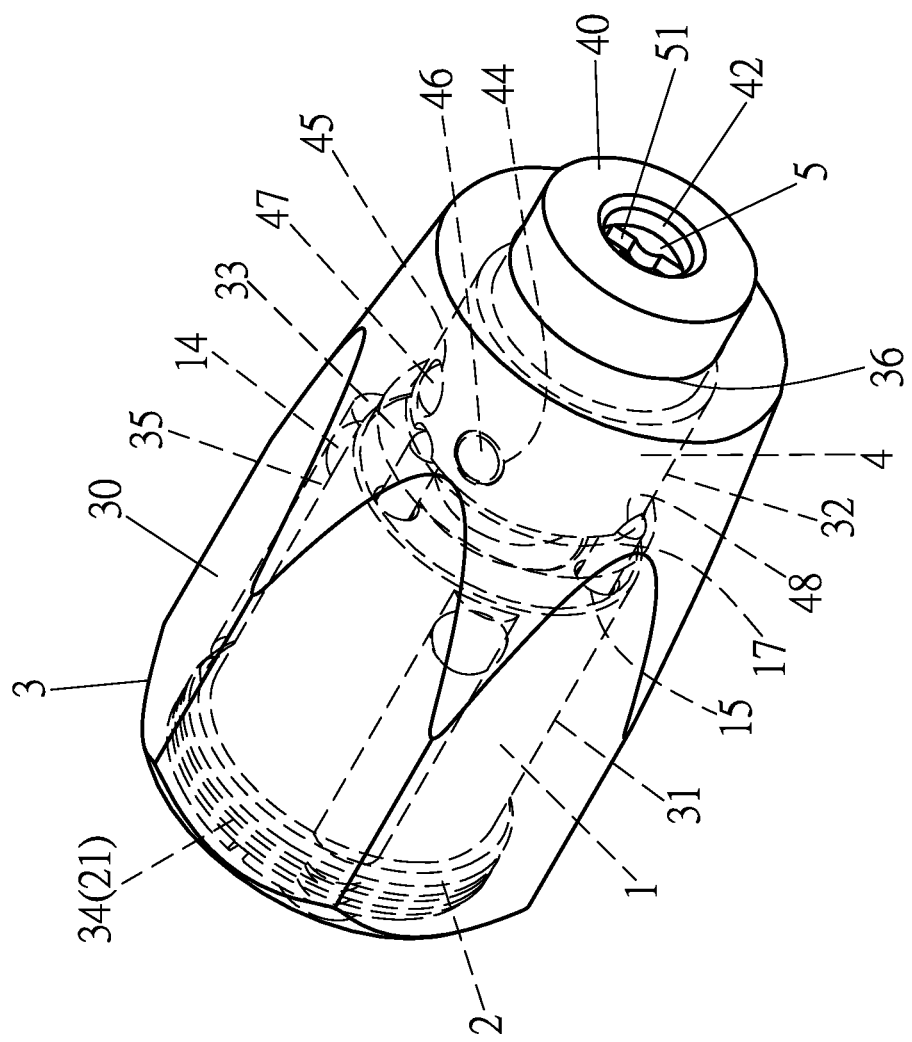
FIG. 2 is a schematic perspective view of the anti-theft fastener with locking feature according to the embodiment of the present invention.
Figure 3:
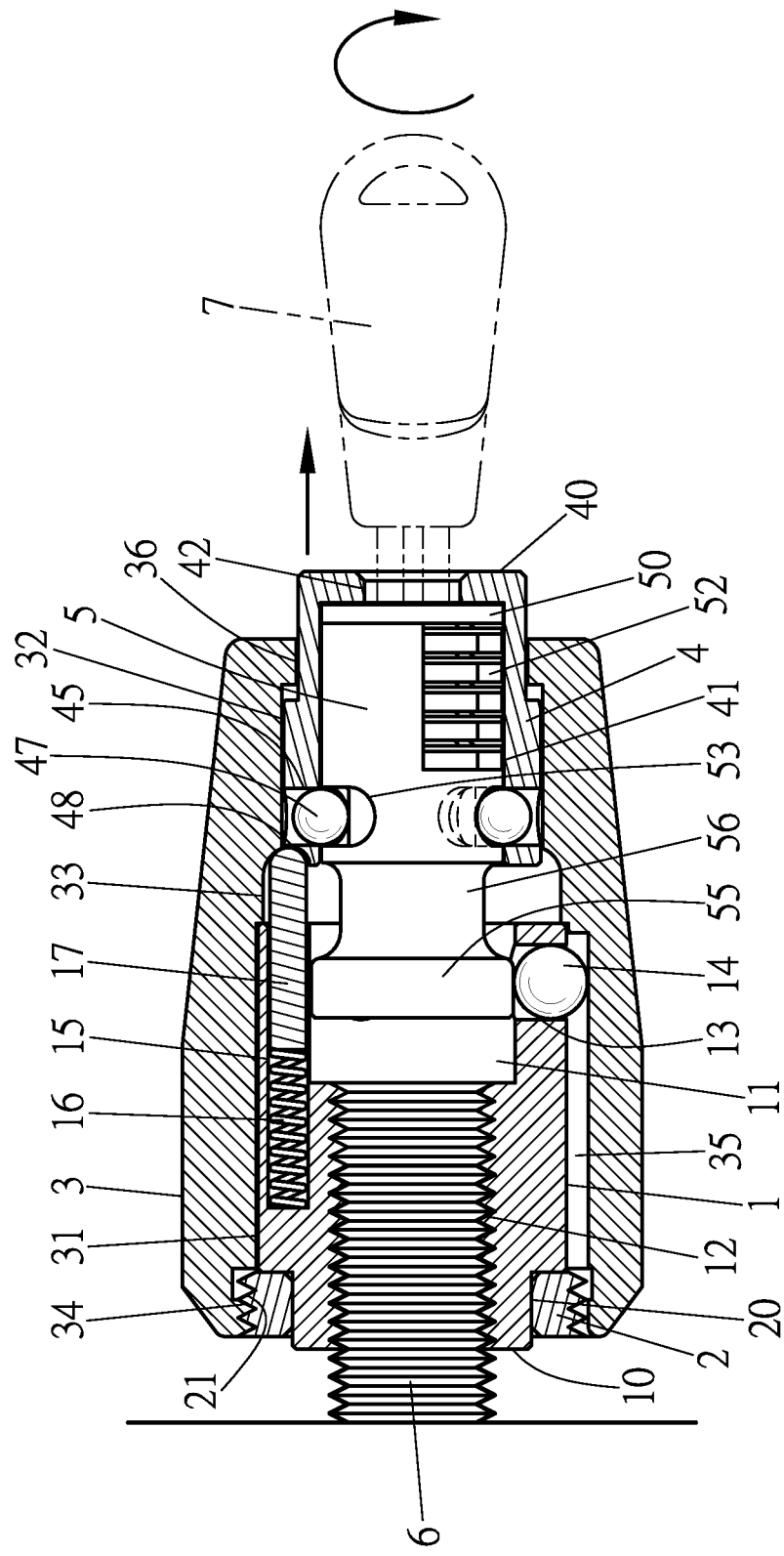
FIG. 3 is a cross-sectional view of the anti-theft fastener with locking feature unlocked (able to be mounted) according to the embodiment of the present invention.

As shown in FIG. 1~3, in an embodiment of the present invention, an anti-theft fastener with locking feature essentially comprises a nut 1, a ring 2, a nut casing 3, a lock casing 4, and a lock 5. A flange 10 is disposed at one end of the nut 1. The nut 1 has therein a concave chamber 11. The concave chamber 11 has therein an inner thread hole 12 extending to and being in communication with the outside of the flange 10. At least a position-limiting hole 13 is disposed on the outer wall surface of the nut 1. The at least a position-limiting hole 13 extends to and communicates with the concave chamber 11. A positioning ball 14 is disposed inside the at least a position-limiting hole 13. At least a receiving groove 15 is disposed on the outer end side of the concave chamber 11 of the nut 1. The receiving groove 15 received therein a spring 16 and an ejecting pin 17. The ring 2 is disposed on the flange 10 of the nut 1. The ring 2 has a through hole 20. An outer thread 21 is disposed on the external wall surface of the ring 2. The nut casing 3 is disposed outside the nut 1. Polygonal facets 30 are disposed on the external wall surface of the nut casing 3. The nut casing 3 has therein a receiving chamber 31 and a receiving channel 32. An engaging groove 33 is disposed between the receiving chamber 31 and the receiving channel 32. An inner thread 34 is disposed at the outer end of the receiving chamber 31. The receiving chamber 31 has therein at least a positioning engaging passage 35. The positioning engaging passage 35 corresponds in position to the positioning ball 14 of the nut 1. A through hole 36 is disposed at the outer end of the receiving channel 32. The lock casing 4 is disposed inside the receiving channel 32 of the nut casing 3. A press portion 40 is disposed at one end of the lock casing 4. The lock casing 4 has therein a receiving chamber 41. The press portion 40 has a through hole 42 passing through the receiving chamber 41. A guide groove 43 is disposed on the inner wall surface of the receiving chamber 41. At least a pin hole 44 and at least a position-limiting hole 45 are disposed on the wall surface of the lock casing 4. A fixing pin 46 is disposed inside the pin hole 44. An engaging ball 47 is disposed inside the at least a position-limiting hole 45. At least a positioning engaging passage 48 is disposed on an end side of the lock casing 4. The lock 5 is disposed inside the receiving chamber 41 of the lock casing 4. A drilling-proof plate 50 is disposed at one end of the lock 5. The drilling-proof plate 50 has a keyhole 51. Plurality locking plates 52 are disposed inside the lock 5. At least a curved groove 53 is disposed on the wall surface of the lock 5. A guide strip 54 is disposed on the wall surface of the lock 5. The guide strip 54 is disposed inside the guide groove 43 of the lock casing 4. An abutting portion 55 is disposed at the other end of the lock 5. An annular groove 56 is disposed on the lock 5. Given the aforesaid structures and arrangement thereof, an anti-theft fastener with locking feature is formed.

As shown in FIG. 1~3, an assembly process involves putting the lock 5 into the receiving chamber 41 of the lock casing 4, putting the guide strip 54 of the lock 5 into the guide groove 43 of the lock casing 4, putting the fixing pin 46 into the pin hole 44 of the lock casing 4, putting the fixing pin 46 into the at least a curved groove 53 of the lock 5, positioning the lock 5 into the lock casing 4, putting the engaging ball 47 into the position-limiting hole 45 of the lock casing 4, positioning a portion of the engaging ball 47 inside the curved groove 53 of the lock 5, putting the lock casing 4 and the lock 5 which have been put together into the receiving channel 32 of the nut casing 3, protruding the press portion 40 of the lock casing 4 out of the through hole 36 of the nut casing 3, putting the spring 16 and the ejecting pin 17 in the receiving groove 15 of the nut 1 in sequence, protruding a portion of the ejecting pin 17 out of the receiving groove 15, putting the positioning ball 14 in the position-limiting hole 13 of the nut 1, putting the ring 2 around the flange 10 of the nut 1, putting the nut 1 and the ring 2 in the receiving chamber 31 of the nut casing 3, positioning a portion of the positioning ball 14 inside the position-limiting hole 13 of the nut 1 in the positioning engaging passage 35 of the nut casing 3, meshing the outer thread 21 of the ring 2 with the inner thread 34 of the nut casing 3, and positioning the nut 1 in the nut casing 3 in a manner that an outer end of the ejecting pin 17 in the receiving groove 15 of the nut 1 protrudes and abuts against the positioning engaging passage 48 of the lock casing 4 from inside. At this point in time, the assembly process is completed.

Figure 4:
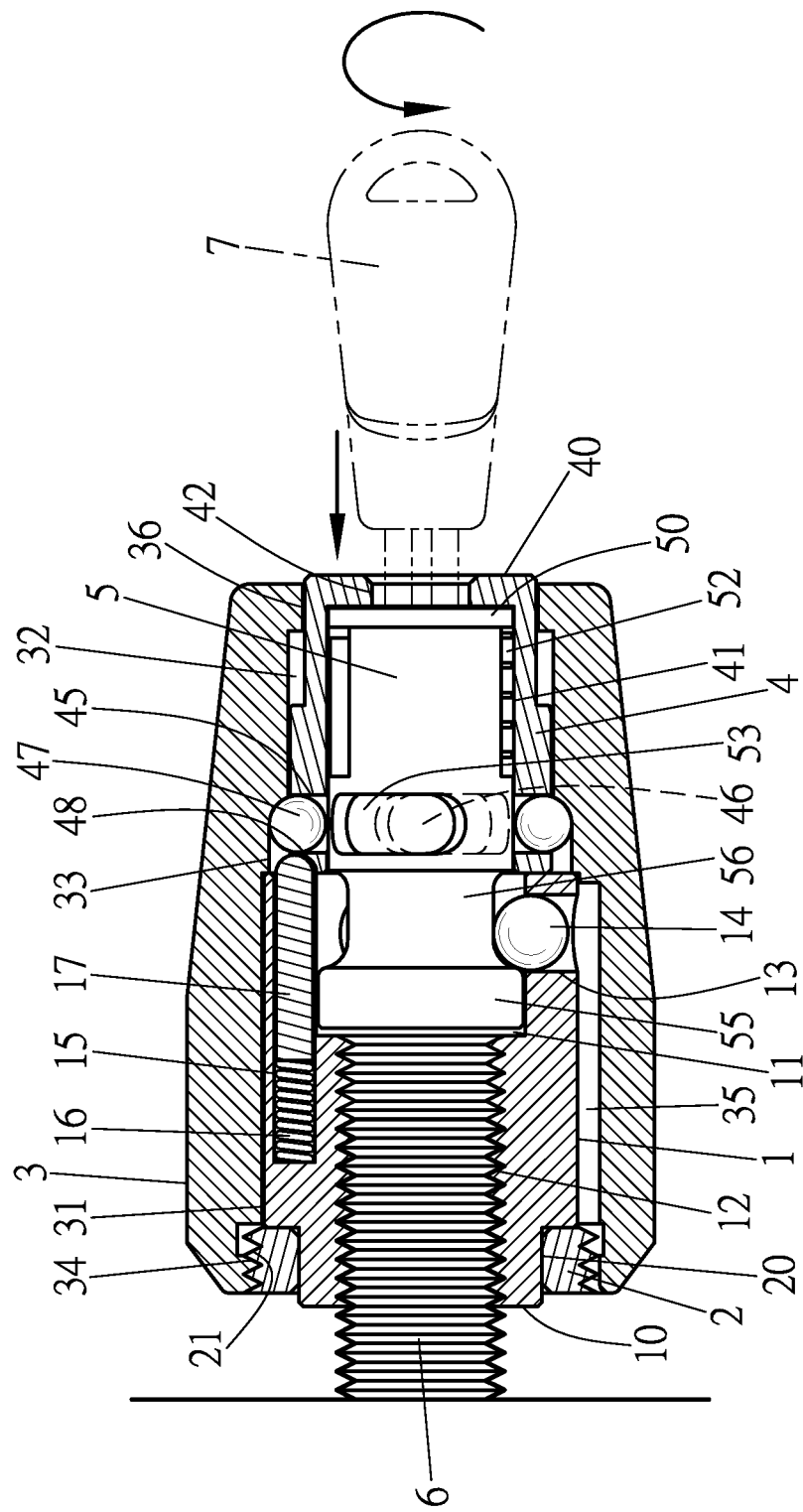
FIG. 4 is a cross-sectional view of the anti-theft fastener with locking feature locked (unable to be mounted) according to the embodiment of the present invention.
Figure 5:
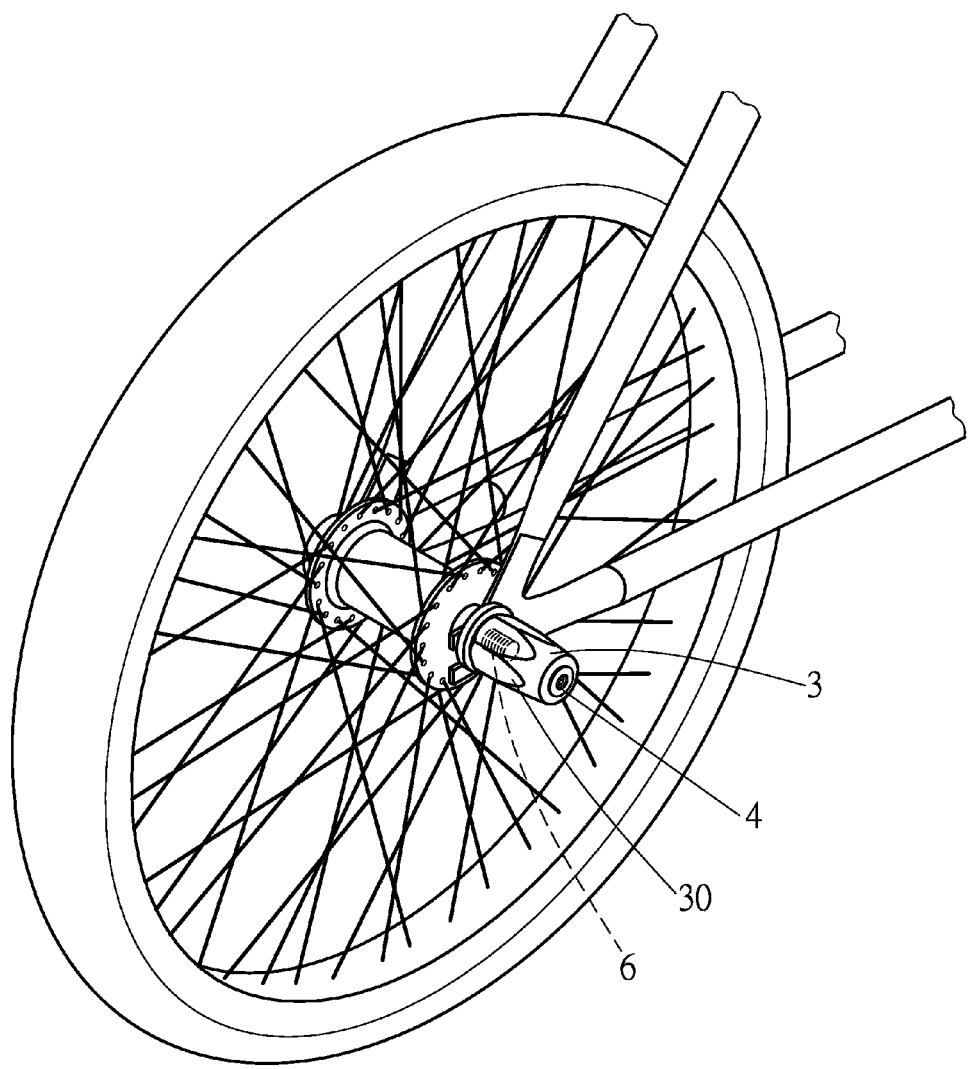
FIG. 5 is a schematic view of application of the anti-theft fastener with locking feature according to the embodiment of the present invention.

As shown in FIG. 2~5, a user's operation of the anti-theft fastener with locking feature is described as follows. As soon as the press portion 40 of the lock casing 4 protrudes outward to stick out of the nut casing 3, the abutting portion 55 of the lock 5 abuts against the positioning ball 14 inside the position-limiting hole 13 of the nut 1, such that the positioning ball 14 cannot retract but is firmly embedded in the positioning engaging passage 35 of the nut casing 3. The anti-theft fastener with locking feature is either fastened or unfastened as shown in FIG. 3. A bolt 6 or a screw of an article to be fastened in place, such as the bolt 6 of a wheel axle of a bicycle as shown in FIG. 5, is fastened to the inner screw hole 12 of the nut 1 of the anti-theft fastener with locking feature. Then, a sleeve or a wrench is fitted around facets 30 of the nut casing 3 and given a torque to thereby fasten or unfasten the anti-theft fastener with locking feature, as the positioning ball 14 is embedded in the positioning engaging passage 35 of the nut casing 3 to drive the nut 1 to rotate. After the anti-theft fastener with locking feature has been fixed in place, the user presses the outward-protruding press portion 40 of the lock casing 4 of the nut casing 3 inward, as shown in FIG. 4, to cause the lock casing 4 driving the lock 5 moving inward, and thus the engaging ball 47 in the position-limiting hole 45 of the lock casing 4 moves to reach the engaging groove 33 of the nut casing 3; meanwhile, the lock 5 pushes the ejecting pin 17 to move into the receiving groove 15 of the nut 1. The ejecting pin 17 compresses the spring 16, such that the spring 16 is compressed resiliently. When a key 7 is used to rotate the lock 5, a portion of the engaging ball 47 inside the position-limiting hole 45 of the lock casing 4 partially moves from the curved groove 53 of the lock 5 to rest against the external wall surface of the lock 5, whereas a portion of the engaging ball 47 protrudes outward from the position-limiting hole 45 of the lock casing 4 to lie in the engaging groove 33 of the nut casing 3. As a result, the lock 5 and the lock casing 4 are engaged with each other and positioned in place to thereby be prevented from moving outward. The abutting portion 55 of the lock 5 slides inward and thus exits the position-limiting hole 13 of the nut 1 to thereby abut against the positioning ball 14 no more. The annular groove 56 of the lock 5 faces the positioning ball 14 squarely. The positioning ball 14 can move into the annular groove 56, and thus the positioning ball 14 is no longer embedded in the positioning engaging passage 35 of the nut casing 3. As a result, the nut casing 3 and the nut 1 are no longer engaged with each other. As soon as a sleeve or a wrench is fitted around the nut casing 3 and turned, the nut casing 3 fails to drive the nut 1 but starts idling; hence, the anti-theft fastener with locking feature of the present invention cannot be rotated and dismounted from the bolt 6 or a screw. In doing so, the anti-theft fastener with locking feature can be firmly locked to the bolt 6 or the screw of an article to thereby manifest anti-theft.

To dismount the anti-theft fastener with locking feature of the present invention from the bolt 6 or the screw, the user inserts the key 7 into the keyhole 51 of the lock 5, and rotates the key 7 to drive the lock 5 to rotate until the curved groove 53 of the lock 5 faces the position-limiting hole 45 of the lock casing 4 squarely. At this point in time, the engaging ball 47 inside the position-limiting hole 45 moves into the curved groove 53 of the lock 5 and exits the engaging groove 33 of the nut casing 3, such that the engaging ball 47 is no longer embedded in the engaging groove 33 of the nut casing 3, whereas the spring 16 inside the receiving groove 15 of the nut 1 restores to its original state resiliently and pushes the ejecting pin 17 outward. As a result, the ejecting pin 17 pushes the lock casing 4 outward, whereas the lock casing 4 drives the lock 5 to move together; meanwhile, the press portion 40 the lock casing 4 protrudes outward once again, whereas the abutting portion 55 of the lock 5 pushes the positioning ball 14 outward once again, such that a portion of the positioning ball 14 is embedded in the positioning engaging passage 35 of the nut casing 3. Hence, the nut casing 3 drives the nut 1 to rotates, such that the anti-theft fastener with locking feature can be released from the bolt 6 or the screw to thereby finalize the dismounting operation.

In the situation where a thief inserts a foreign object into the lock 5 rather than follows a typical unlocking procedure, if the torque is excessive, the lock 5 and the lock casing 4 will start idling, and thus the ejecting pin 17 will abut against the lock casing 4 resiliently. Hence, rotation of the lock casing 4 causes the ejecting pin 17 to bounce resiliently, thereby preventing the rotation of the nut 1. Accordingly, the present invention reaches the purpose of anti-theft.

In conclusion, the present invention not only achieves the anticipated objectives and advantages, but is also more satisfactory and practical than the prior art. However, the aforesaid embodiment is illustrative of the present invention only, but should not be interpreted as restrictive of the scope of the present invention. Hence, all equivalent changes and modifications made to the aforesaid embodiment without departing from the technical solution disclosed in the present invention should fall within the scope of the present invention.

What is claimed is:

1. An anti-theft fastener with locking feature is comprised of:
    a nut having therein a concave chamber and having an end provided with a flange, the concave chamber having therein an inner screw hole extending to and being in communication with an outer end of the flange, wherein at least a position-limiting hole is disposed on the external wall surface of the nut and communicates with the concave chamber of the nut, the at least a position-limiting hole having therein a positioning ball, wherein at least a receiving groove is disposed on an outer end side of the concave chamber of the nut, wherein a spring and an ejecting pin are disposed in the receiving groove of the nut;
    a ring disposed around the flange of the nut;
    a nut casing enclosing the nut, the nut casing having therein a receiving chamber and a receiving channel, wherein an engaging groove is disposed between the receiving channel and the receiving chamber of the nut casing, wherein at least a positioning engaging passage is disposed in the receiving chamber of the nut casing and corresponds in position to the positioning ball of the nut, wherein a through hole is disposed at an outer end of the receiving channel of the nut casing;
    a lock casing disposed in the receiving channel of the nut casing, wherein a press portion is disposed at an end of the lock casing and inserted into the through hole of the nut casing, the lock casing having therein a receiving chamber, the press portion having a through hole passing through the receiving chamber of the lock casing, wherein a guide groove is disposed on an inner wall surface of the receiving chamber of the lock casing, wherein at least a pin hole and at least a position-limiting hole are disposed on a wall surface of the lock casing, the at least a pin hole having therein a fixing pin, the at least a position-limiting hole having therein an engaging ball; and
    a lock disposed in the receiving chamber of the lock casing and having an annular groove, wherein a guide strip and at least a curved groove are disposed on a wall surface of the lock, the guide strip being disposed in the guide groove of the lock casing, wherein an abutting portion is disposed at an end of the lock.

2. The anti-theft fastener as claimed in claim 1, wherein at least a positioning engaging passage is disposed on an end side of the lock casing to accommodate the ejecting pin of the nut.

* * * * *